United States Patent [19]

Matsuoka et al.

[11] Patent Number: 5,220,717
[45] Date of Patent: Jun. 22, 1993

[54] METHOD OF MAKING CAPSULES OF DEHYDRATED SLUDGE AND APPARATUS THEREFOR

[75] Inventors: Toshio Matsuoka; Yasuhito Kougami, both of Niihama, Japan

[73] Assignee: Sumitomo Heavy Industries, Ltd., Tokyo, Japan

[21] Appl. No.: 786,226

[22] Filed: Oct. 31, 1991

[30] Foreign Application Priority Data

Nov. 5, 1990 [JP] Japan .................... 2-297089

[51] Int. Cl.$^5$ ................... B23P 17/02; B65B 43/54
[52] U.S. Cl. ........................ 29/422; 29/773; 29/DIG. 15; 29/DIG. 40; 53/576
[58] Field of Search ............ 29/422, 773, 778, 414, 29/527.6, DIG. 15, DIG. 40, 2.25; 53/450, 451, 550, 551, 576; 72/203, 204, 275

[56] References Cited

U.S. PATENT DOCUMENTS

| | | |
|---|---|---|
| 2,340,260 | 1/1944 | Clunan . |
| 3,721,060 | 3/1973 | Qunito .................. 53/576 X |
| 3,763,621 | 10/1973 | Klein et al. ............. 53/576 X |
| 3,815,649 | 6/1974 | Delmar ................... 53/576 X |
| 4,364,220 | 12/1982 | Rausing ................. 53/451 X |
| 4,495,748 | 1/1985 | Rowell ................... 53/451 X |
| 4,518,507 | 5/1985 | Conner .................. 53/576 X |

FOREIGN PATENT DOCUMENTS

| | | |
|---|---|---|
| 537852 | 7/1973 | Czechoslovakia . |
| 2722472 | 12/1977 | Fed. Rep. of Germany . |
| 3642057 | 6/1988 | Fed. Rep. of Germany . |
| 914156 | 12/1962 | United Kingdom . |
| 944239 | 12/1963 | United Kingdom . |
| 1580976 | 12/1980 | United Kingdom . |

*Primary Examiner*—Mark Rosenbaum
*Assistant Examiner*—Peter Dungba Vo
*Attorney, Agent, or Firm*—Nikaido Marmelstein Murray & Oram

[57] ABSTRACT

Disclosed is a method of making capsules of dehydrated sludge which can omit conventionally required unit operations, reduce or eliminate the cost of the equipment and power, heat energy and consumables required for operation, and assures simple operation. The method includes the steps of shaping a steel strip into the form of a channel, supplying sludge into the channel formed in the previous step, shaping the channel formed steel strip with the sludge charged therein such that it has practically a circular cross-section to enclose the sludge, pressing and crushing an outer periphery of a steel tube shaped in the previous step to form a constriction, pressing and cutting the constriction and repeating series of the above-described steps.

8 Claims, 14 Drawing Sheets

METHOD OF MAKING CAPSULES OF DEHYDRATED SLUDGE AND APPARATUS THEREFOR

BACKGROUND OF THE INVENTION

1. Field of the Invention

The present invention relates to a method of making capsules of dehydrated sludge and an apparatus therefor.

2. Description of the Related Art

Processing used batteries, EAF dust or incineration ash requires processing sludge or by-product which often requires the step of agglomeration of sludge. In the conventional method, sludge agglomeration is generally started with moisture adjustment by dehydration of the sludge or addition of water to the sludge. After the water content of the sludge is adjusted (to adjust the water content, complete drying of the sludge is often necessary), a binder is added to the sludge. The mixture is kneaded and is then formed by an agglomeration machine (such as a briquetting machine, a pelletizer or a sintering machine). Generally, this sludge agglomeration is repeated more than once to produce sludge agglomerate having a suitable size. That is, it requires facilities for classifying the agglomerate having a suitable size, grinding the agglomerate which is larger than the upper limit size together with those which are smaller than the lower limit size, and returning the said ground materials to the sludge feed.

The agglomerate of sludge made in the manner described above must be strong enough to withstand subsequent steps, such as conveying, drying, sintering, melting or chemical reaction. Therefore, they are subjected to various troublesome tests, such as crushing strength test, wearing test, shattering test, drying and sintering reaction test, in order to optimize the said steps. Not only is the sludge agglomeration process complicated as mentioned above, but also quality control conducted in continuous or batch operation for the said process is not an easy one.

The sludge agglomerate made through even such a complicated process may be cracked, worn or ground unavoidably in the subsequent processes. The equipment for making sludge agglomerate is expensive due to the above-described complicated process, and requires large space for installation. When the equipment is incorporated in a relatively small scale plant for processing used dry batteries, EAF dust or incineration ash, it occupies a large space as compared with the main equipment and thereby it is quite unreasonable.

SUMMARY OF THE INVENTION

An object of the present invention is to provide a method of making capsules of dehydrated sludge and an apparatus therefor which are capable of omitting the known unit operations of reducing or eliminating the cost of the equipment, power, heat energy or consumables required for operation, and of facilitating operation when agglomerate of sludge are made.

To achieve the above-described object, according to one aspect of the present invention, there is provided a method of making capsules of dehydrated sludge which comprises the step of shaping a steel strip into the form of a channel, the step of supplying sludge into the channel formed in the previous step, the step of shaping the channel formed steel strip with the sludge charged therein such that it has substantially a circular cross-section to enclose the sludge, the step of pressing and crushing at intervals the steel tube shaped in the previous step to form a constriction, the step of pressing and cutting the steel tube at the constriction, and repeating series of the above-described steps.

According to another aspect of the present invention, there is provided an apparatus for making capsules of dehydrated sludge which comprises a channel forming device for shaping a steel strip into the form of a channel, a sludge supplying device for supplying sludge into the channel, a device for overlapping two edge portions of the channel formed steel strip with the sludge charged therein to form a steel tube, a pressing device for pressing and crushing at intervals the steel tube to form a constriction and a pressing/cutting device for pressing and cutting the constriction.

DETAILED DESCRIPTION OF THE PREFERRED EMBODIMENTS

A first embodiment of the present invention will be described below with reference to the accompanying drawings.

Figure 1:
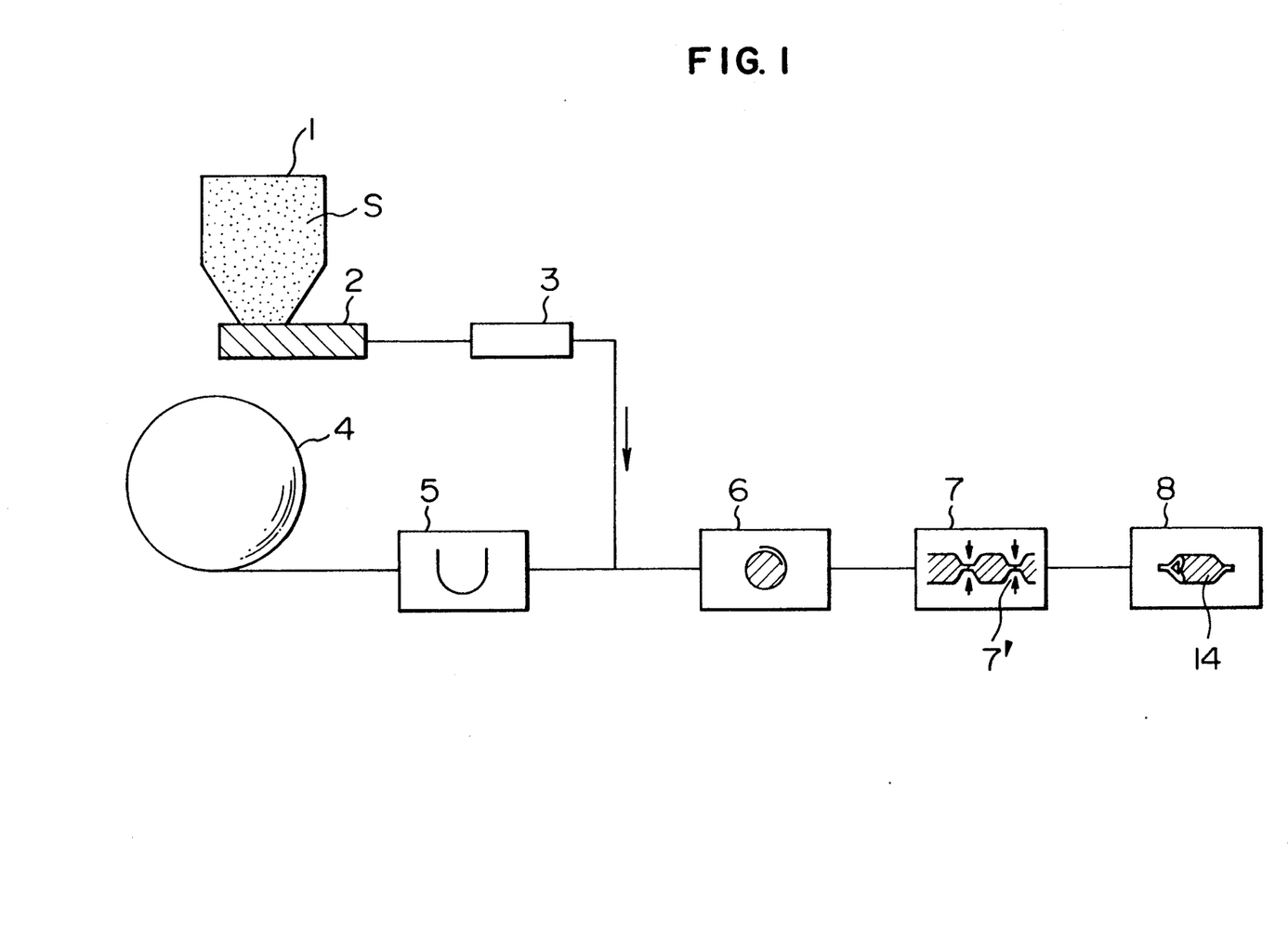
FIG. 1 is a block diagram of a method according to the present invention.

Referring first to FIG. 1, sludge S in a sludge bin 1 is continuously or intermittently fed by a screw feeder 2. The dehydrated sludge extruded from a dice 3 is fed continuously or intermittently by cutting into a suitable length. The sludge of a suitable length or continuous sludge is wrapped with a steel strip 4, and the shaped steel strip containing the sludge is cut into a fixed length.

In that case, the steel strip 4 unwound from a reel is first continuously shaped into the form of a channel such that it has a U-shaped cross-section in a channel forming step 5 by a multi-stage forming rollers consisting of upper and lower rolls. The sludge S extruded from the dice 3 is continuously or intermittently received by this channel. The channel containing the sludge is formed by rollers into a steel tube such that it has substantially a circular or O-shaped cross-section to enclose the sludge S in a sludge enclosure step 6.

In a subsequent pressing step 7, the continuous steel tube having the O-shaped cross-section is pressed at suitable fixed positions in a direction perpendicular to the axial direction (indicated by arrows in FIG. 1) to make constrictions 7' at fixed intervals. The constrictions 7' are cut to obtain agglomerate 14 (products) having a fixed size (hereinafter, these agglomerates are referred to as "capsules").

Figure 2:
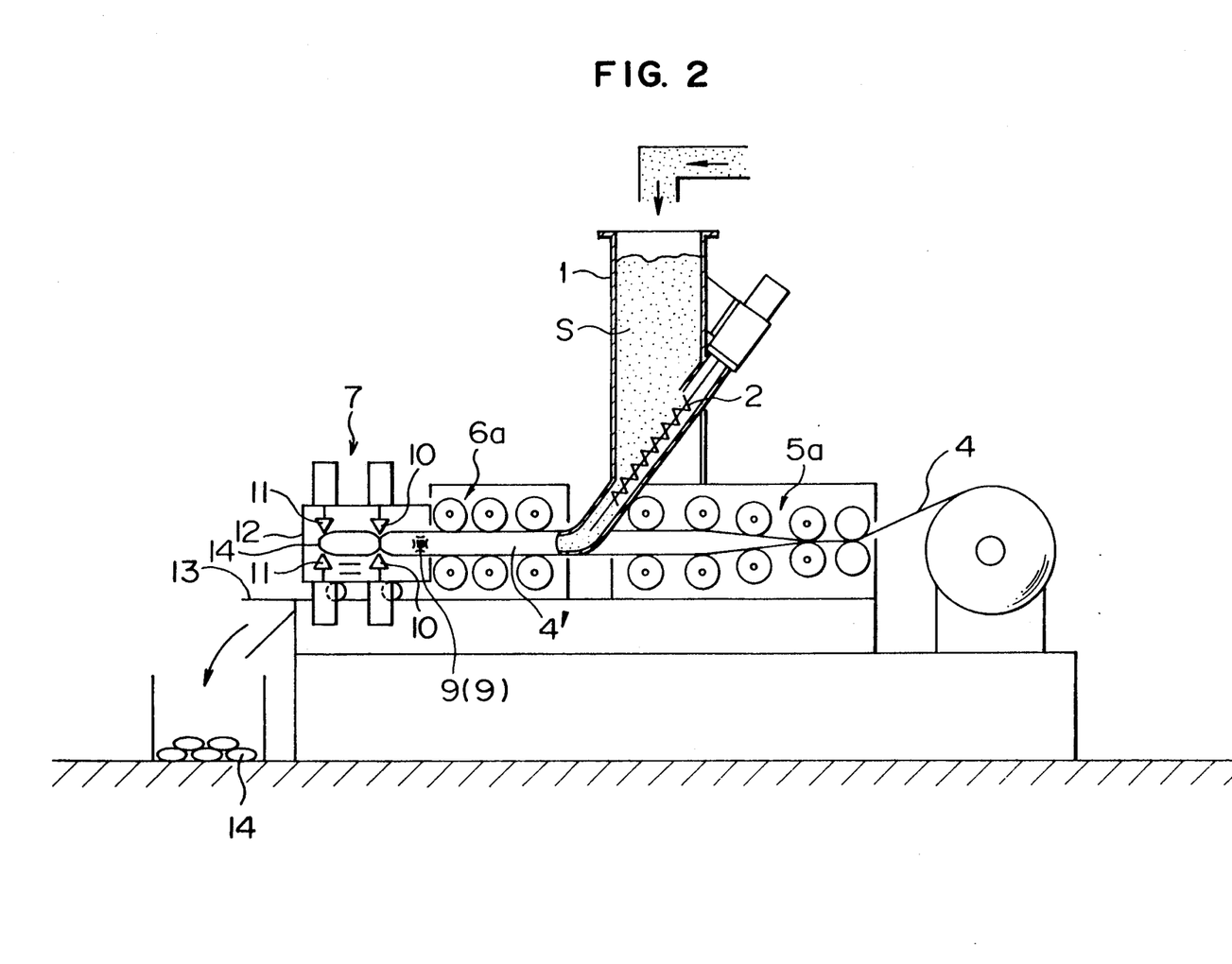
FIG. 2 is a schematic front view of a first embodiment of an apparatus for carrying out the method according to the present invention.

FIG. 2 shows an example of an apparatus used to continuously carry out the method according to the present invention shown in FIG. 1. The steel strip 4 wound around a reel in a manner similar to that of FIG. 1 is fed to rolls 5a located before charging which rolls perform the channel forming step 5. After the channel is formed, the steel strip 4 advances to rolls 6a located after charging which rolls perform the sludge enclosure step 6. Immediately before the steel strip 4 is fed to the rolls 6a, the sludge S is supplied into the channel by the screw feeder 2.

Figure 23:
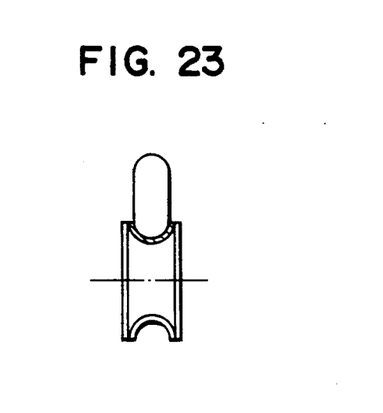
FIG. 23 is a side elevational view of channel forming rolls used in the embodiment shown in FIG. 2.
Figure 24:
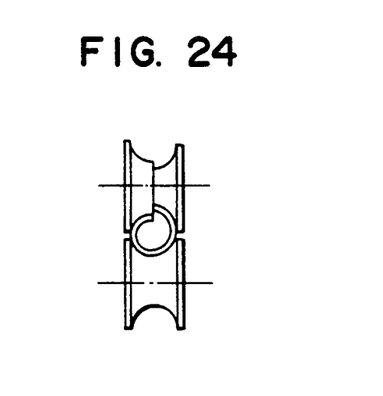
FIG. 24 is a side elevational view of steel tube forming front-stage rolls used in the embodiment shown in FIG. 2.

As shown in FIG. 23, the rolls 5a each consist of a lower roll having a semi-circular concave cross-section on the outer periphery thereof, and an upper roll having a semi-circular convex cross-section on the outer peripheral portion so that both rolls are complementary to form the semi-circular channel between the rolls. The rolls 6a located after the sludge enclosing step consist of a set of front rolls, the lower roll of which has a semi-circular concave cross-section, and the upper roll of which has a semi-circular concave cross-section with a shoulder at the center as shown in FIG. 24, and a set of rear rolls which consists of four rolls having a semicircular concave cross-section shown in FIG. 25.

A steel strip 4' containing the sludge S is slightly recessed from two sides thereof by right and left pressing heads 9 which perform the pressing step 7. Next, the steel tube 4' is pressed from above and below by upper and lower pressing heads 10 disposed perpendicular to the right and left pressing heads 9 to form constrictions in the example shown in FIG. 17, the steel tube is pressed from the sides thereof by pressing heads 47. The constrictions are cut off by another pair of upper and lower pressing heads 11 to obtain capsules 14. The pressing heads are set on a movable car 12 which moves back and forth in a direction in which the steel strip is being sent by means of a screw shaft driven by a motor (not shown).

The components of the apparatus shown in FIG. 2 should satisfy the following conditions. First, the steel strip should be sufficiently strong and hence maintain the shape by plastic forming, and may be subjected to the surface treatment, such as plating, so that it can remain corrosive during storage.

Because it is desired that the outer shell have a relatively small mass as compared with the sludge S, the thickness of the steel strip 4 is 0.5 mm or less.

The channel forming step 5 employs a multi-stage roll forming device such as that shown in FIG. 2.

Figure 25:
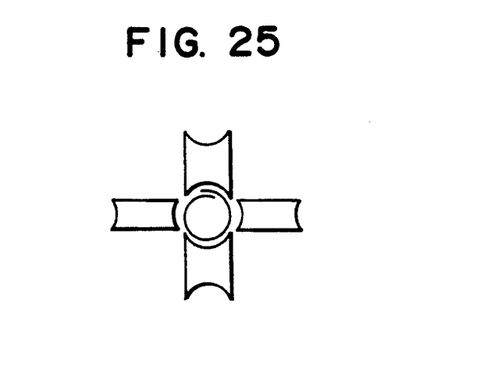
FIG. 25 is a side elevational view of steel tube forming rear-stage rolls used in the embodiment shown in FIG. 2.

In the sludge enclosure step 6, the sludge S is charged into the steel strip 4 shaped into the form of a channel (U shape) in the channel forming step 5 by the screw feeder 2, and then the two edge portions of the steel strip 4 are overlapped with each other by a multi-stage forming device consisting of upper and lower rolls as shown in FIG. 24 and 25 such that the steel strip 4 has substantially a circular cross-sectional form.

Next, in the pressing step 7 in which constrictions are formed, the steel tube having a substantially circular cross-section is partially pressed to form constrictions 9 and thereby seal the sludge S in the portion of the steel tube between the adjacent constrictions 14. This allows the closed sludge S to serve as the inner die when the two ends of the outer shell (steel strip) are plastically deformed, thus preventing leakage of sludge.

Figure 4:
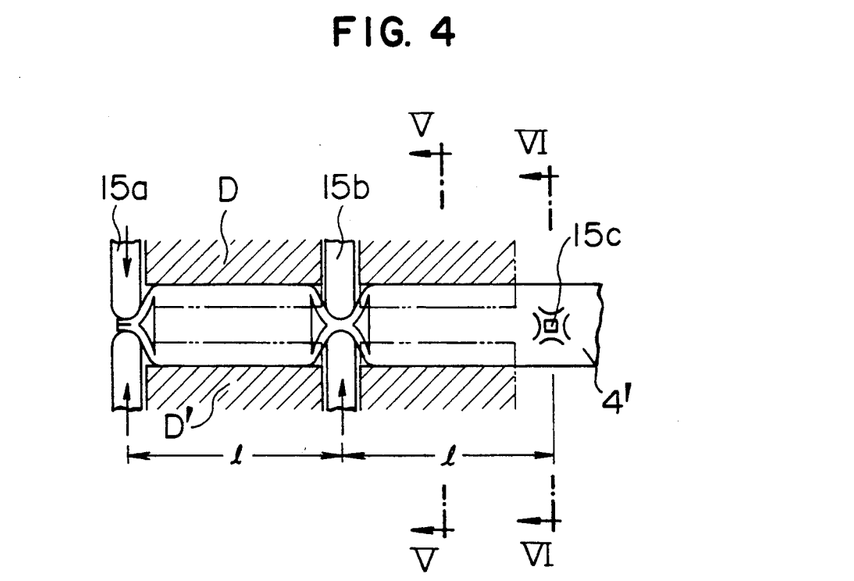
FIG. 4 shows a pressing head used in the pressing step.
Figure 5:
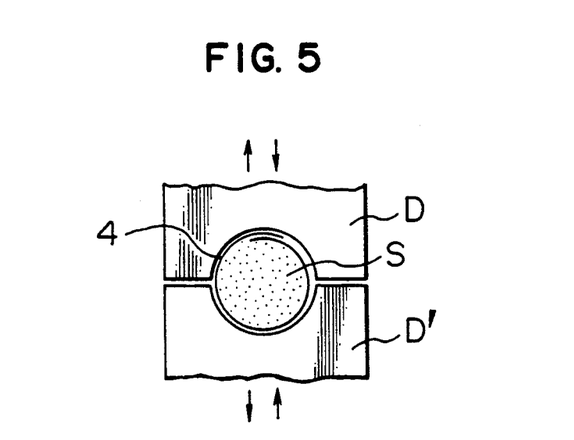
FIG. 5 is a section taken along the line V—V of FIG. 4.
Figure 6:
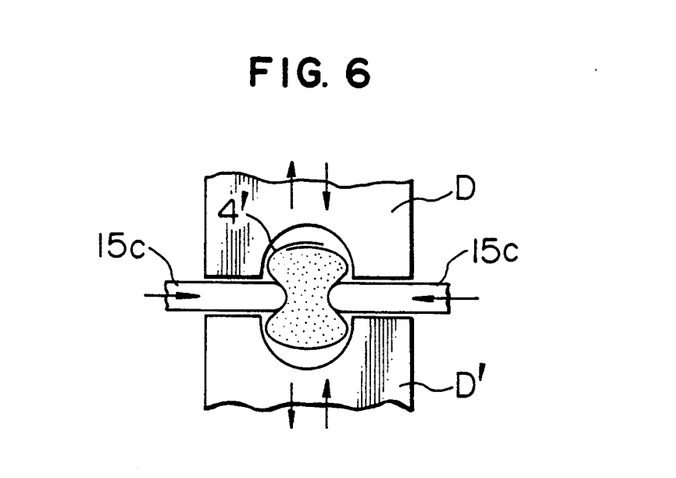
FIG. 6 is a section taken along the line VI—VI of FIG. 4.

In the pressing step 7, when the steel tube 4' is pressed by the pressing heads, the sludge S moves in the cross-sectional direction. Hence, the portion of the steel tube 4' between the constrictions is retained from outside by upper and lower (or right and left) dice D and D' forming a circular cross-section consisting of two semi-circular spaces, as shown in FIGS. 4 and 5.

Figure 3:
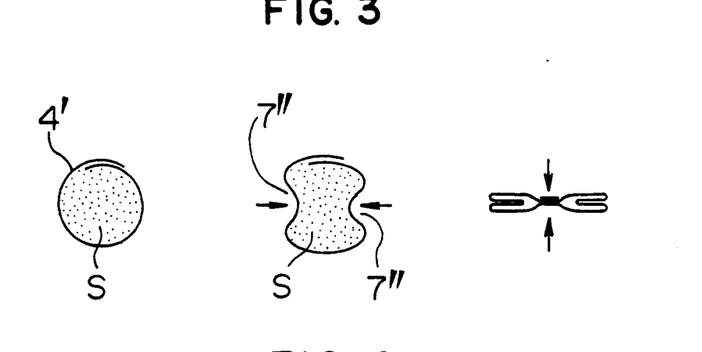
FIG. 3 illustrates the pressing step.

The constrictions 7' may be formed in the manner shown in FIG. 3. In this example, a relatively small recess 7" is first formed on the steel tube 4' in the horizontal (or vertical) direction as viewed in the direction of its cross-section, and then the same position of the steel tube 4' is pressed in the vertical (or horizontal) direction perpendicular to the direction in which the recess is formed (the horizontal direction) to make a constriction for sealing so that it has a cross-sectional form shown in FIG. 3, like the sealed port of a paper milk pack (what is called a tetra-pak).

To assure sealing of the contents (sludge) and make the sludge serve as the inner die when the constrictions 7' are formed in the pressing step, at least one of the two pressing portions may be provided with rollers. This roller type pressing portion is moved not only in the vertical (or horizontal) direction but also in the direction of feeding when it presses the steel tube 4'. To achieve this, drive of the rollers may be performed.

Examples of the pressing device will be further described in detail with reference to FIGS. 4 through 7. In the example shown in FIG. 4, three pressing head pairs 15a, 15b and 15c are mounted on the movable car 12 (FIG. 2) separate from each other at fixed intervals μ in the direction in which the steel tube 4' is fed. The pressing head pair 15a presses and cuts the sealed portion of the steel tube 4'. In a case wherein the steel tube 4' is not strong enough to keep solely the shape as it is, the pressing head pair 15a prevents the sludge S from leaking from the distal end of the steel tube 4' while the pressing head pair 15b crushes the steel tube. Also, the pressing head pair 15a not only holds the steel tube immediately before the sludge containing steel tube is cut off to produce a capsule but also prevent the said sludge containing steel tube from shifting.

The pressing head pair 15b crushes the steel tube to form a constriction. The pressing head pair 15c partially recesses the steel tube 4' in the direction perpendicular to the direction in which the steel tube 4' is crushed to form a constriction by the pressing head pair 15b.

Figure 7A:
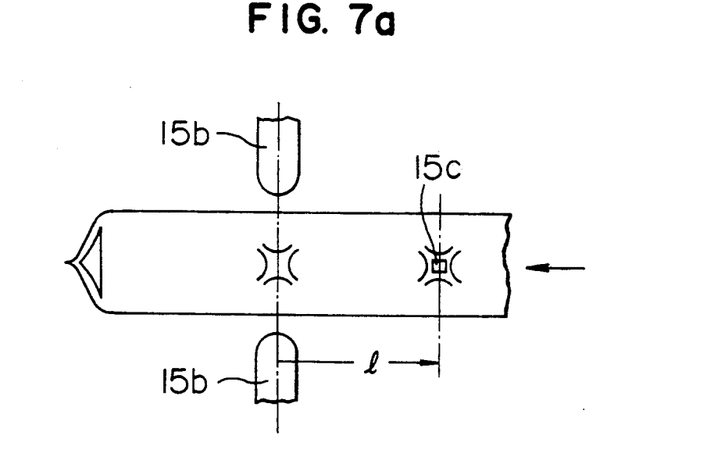
FIGS. 7a and 7b are schematic view showing an example in which the pressing step is done by two pairs of pressing heads.
Figure 7B:
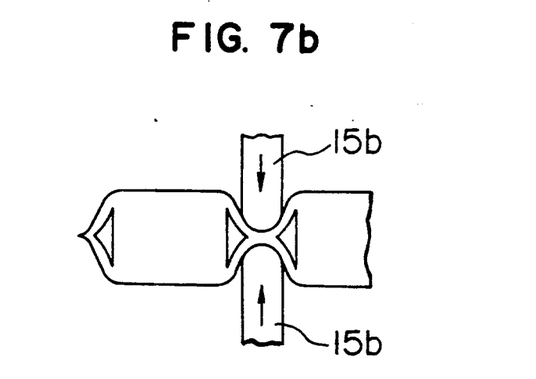

In a case wherein the steel tube is strong enough and hence the sludge S does not leak from the distal end of the steel tube 4' without squeezing said end while it is crushed by the pressing head pair 15b, two pressing head pairs 15b and 15c may be provided on the movable car 12 separate from each other by a distance $\mu$ in the direction in which the steel tube is sent, as shown in FIGS. 7a, 7b.

Figure 8:
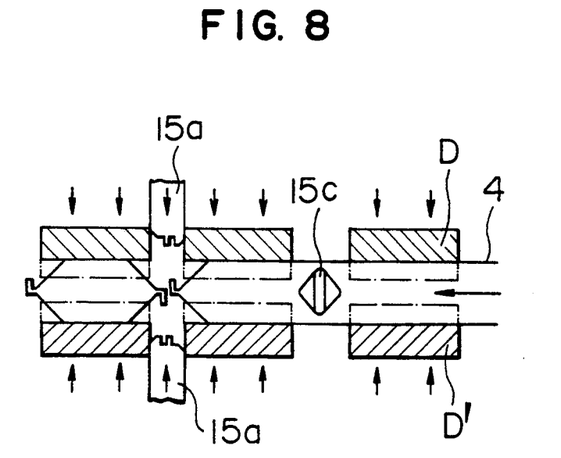
FIG. 8 shows the pressing and cutting step.

In either case, the steel tube 4, is first partially recessed by the right and left pressing heads 15c, and then crushed by the upper and lower pressing heads 15b disposed perpendicular to the right and left pressing heads 15c to form a constriction. Thereafter, as shown in FIG. 8, there is a method in which the pressing head pair 15b is replaced by the pressing head pair 15a to cut the constriction by a blade provided on the distal end of the pressing head pair 15a. The right and left pressing heads 15c and the upper and lower pressing heads 15b may be disposed at the same position perpendicular to each other not separated from each other by the distance $\mu$.

Figure 9A:
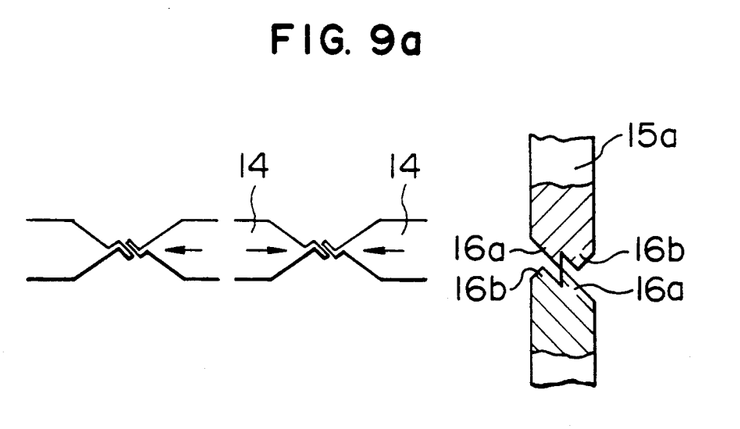
FIGS. 9a and 9b show examples of a cutting blade.
Figure 9B:
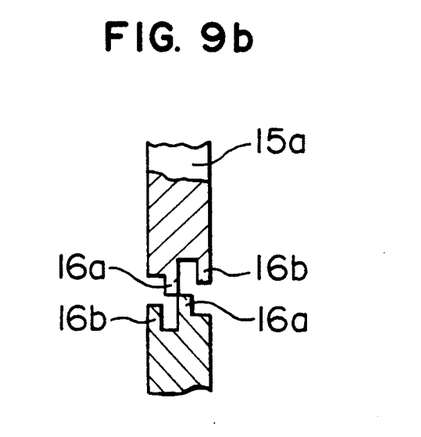
Figure 10:
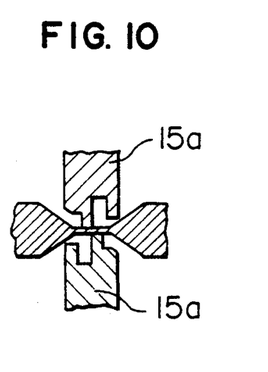
FIG. 10 shows crushing done by the pressing head.
Figure 11:
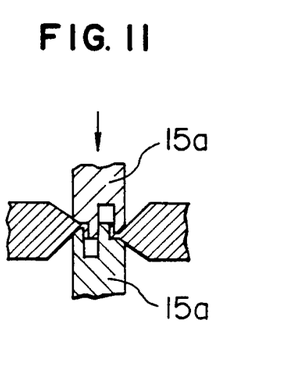
FIG. 11 shows cutting done by the pressing head.
Figure 12:
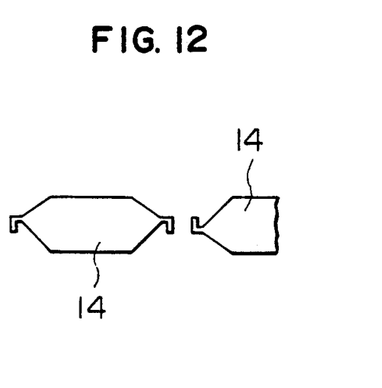
FIG. 12 shows a produced capsule showing the cut end.

Crushing and cutting by the pressing heads 15a or 15b will be described below. As shown in FIGS. 9a and 9b, two protrusions 16a and 16b are formed on the distal end of each of the pressing heads 15a. The protrusion 16a is made longer than the protrusion 16b. As the steel tube 4' is pressed from above and below by such pressing heads 15a, as shown in FIG. 10, it is firstly cut then bent at the constriction as shown in FIG. 11, to produce a capsule 14 whose end portion is completely sealed, as shown in FIG. 12.

Figure 13A:
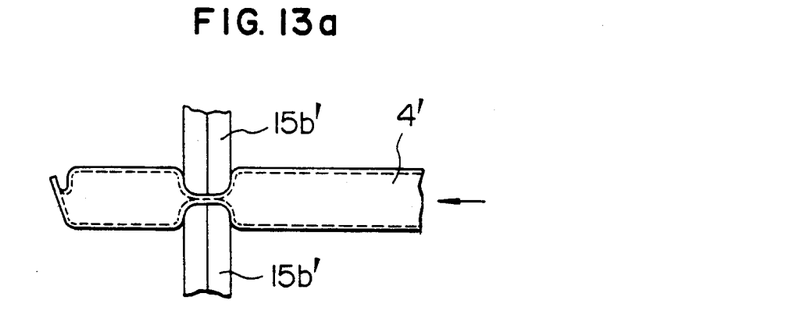
FIGS. 13a and 13b show an example of crushing and cutting done by a mating type pressing and cutting head.
Figure 13B:
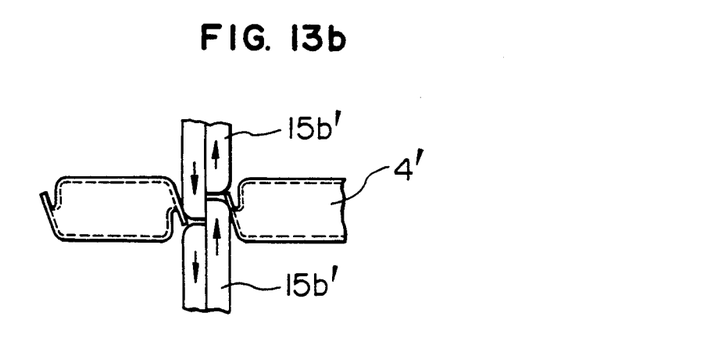

In another example, one pair of upper and lower pressing heads may be provided, as shown in FIG. 13 wherein the steel tube 4' is pressed by the upper and lower pressing heads 15b, (FIG. 13a) to first form a constriction and then the constriction is cut by the relative sliding movement of the pressing heads 15b' which split into two portions forming cutting edges as shown in FIG. 13b.

A second embodiment of the present invention which continuously carries out the method according to the present invention will be described below with reference to FIGS. 14 to 22.

Figure 14:
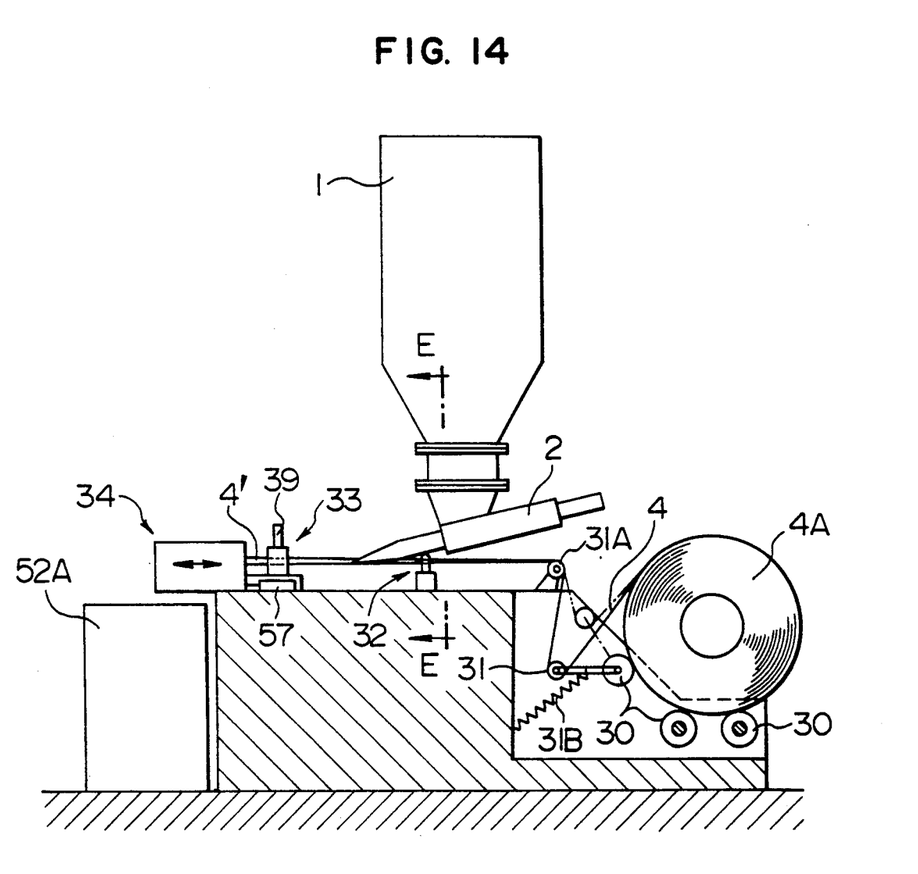
FIG. 14 is a schematic view of a second embodiment of the apparatus for carrying out the method according to the present invention.

FIG. 14 shows the layout of the components of the apparatus.

Reference numeral 30 denotes rotatable rolls for supporting a steel strip coil 4A; 31, a dancer roll; 32, a channel forming member for shaping the steel strip into the form of a channel; 33, a clamping member for fixing the steel tube 4'; and 34 a capsule forming unit.

Figure 15:
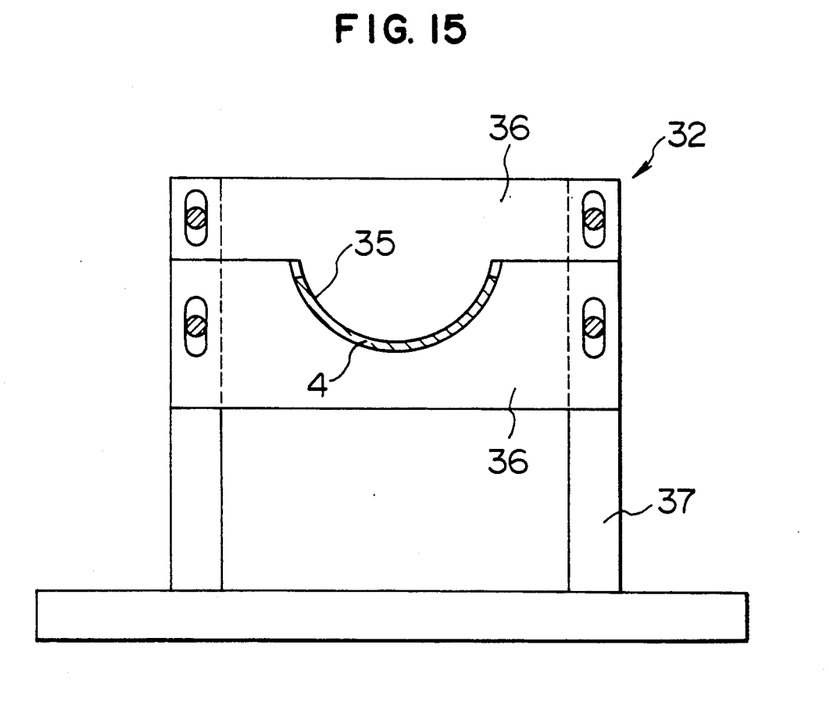
FIG. 15 is an enlarged cross-sectional view taken along the line E—E of FIG. 14.
Figure 16:
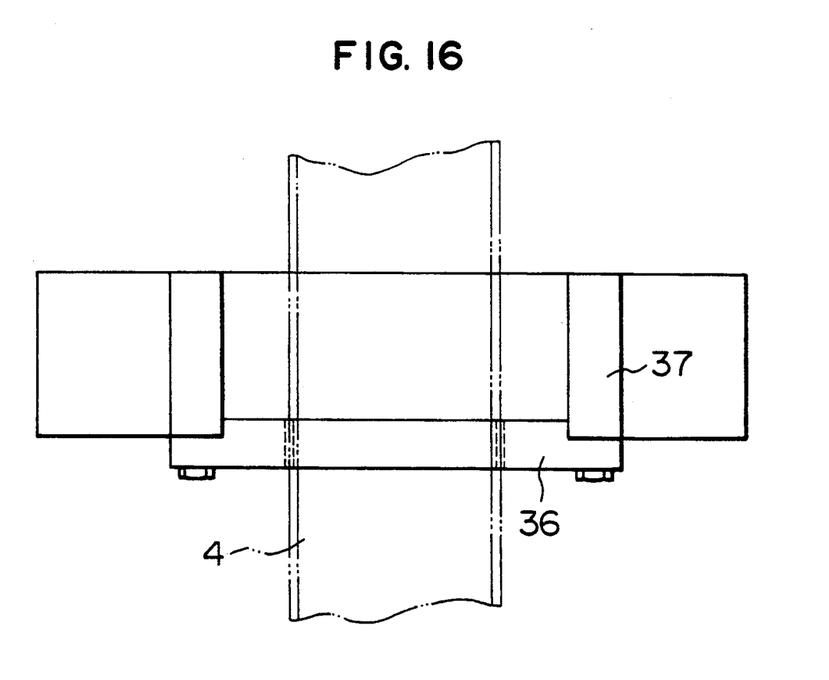
FIG. 16 is a plan view of FIG. 15.

The channel forming member 32 consists of a pair of guide plates 36 to form a semi-circular slit 35 between opposed surfaces thereof as shown in FIGS. 15 and 16. The guide plates 36 are supported by columns 37. When a steel strip 4 passes through the slit 35, it is bent to a channel.

Figure 17:
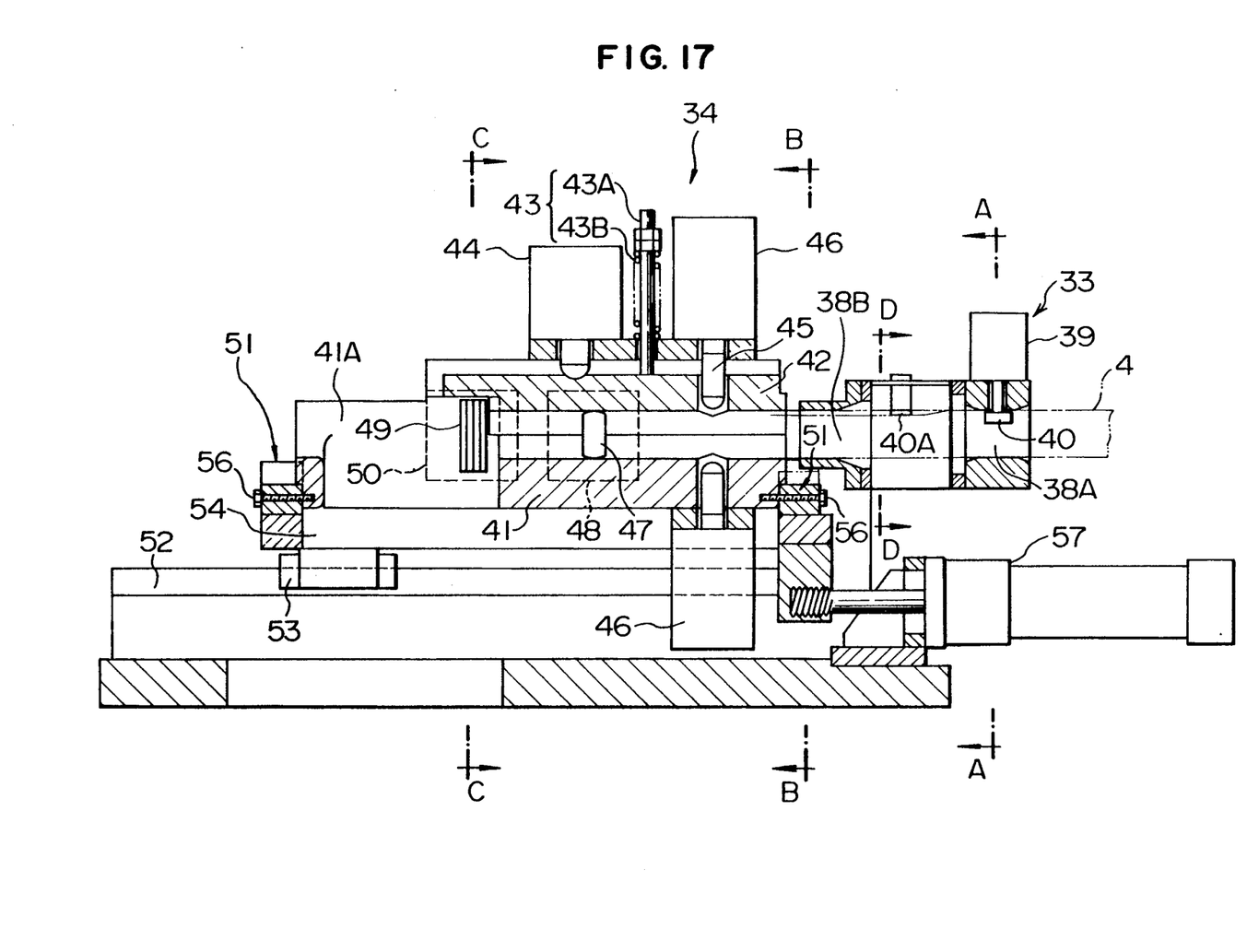
FIG. 17 is a cross-sectional view of a capsule forming unit of the capsule making apparatus of FIG. 14.
Figure 18:
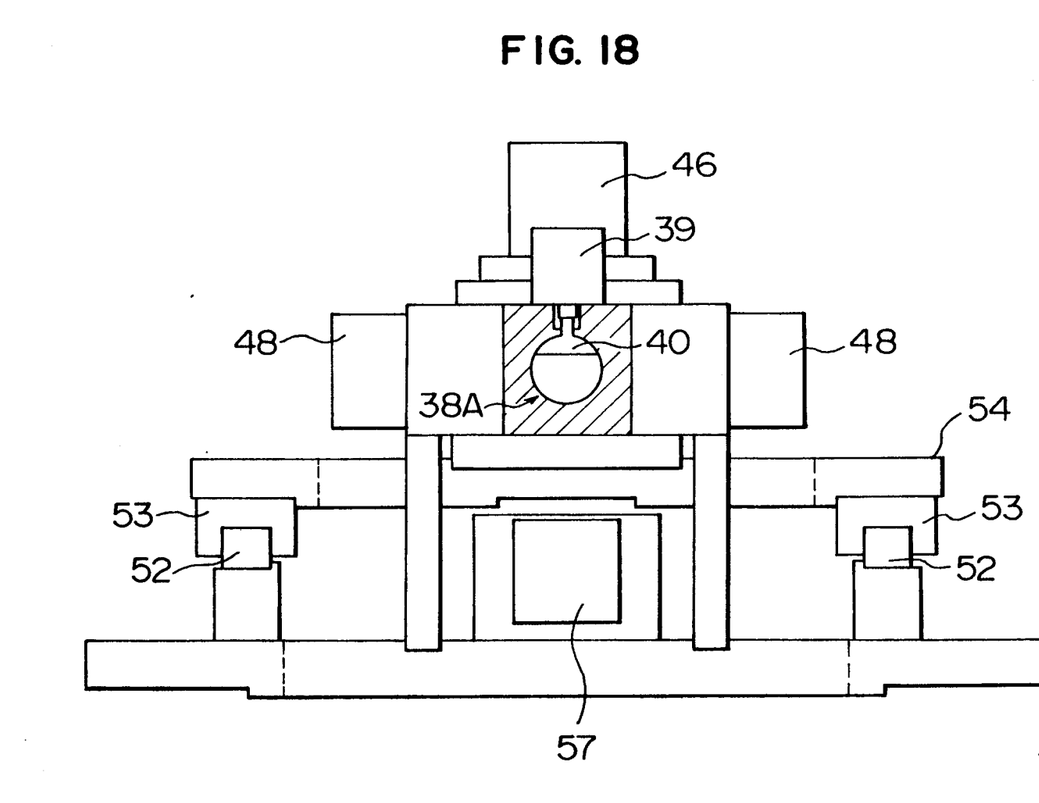
FIG. 18 is a cross-sectional view taken along the line A—A of FIG. 17.
Figure 19:
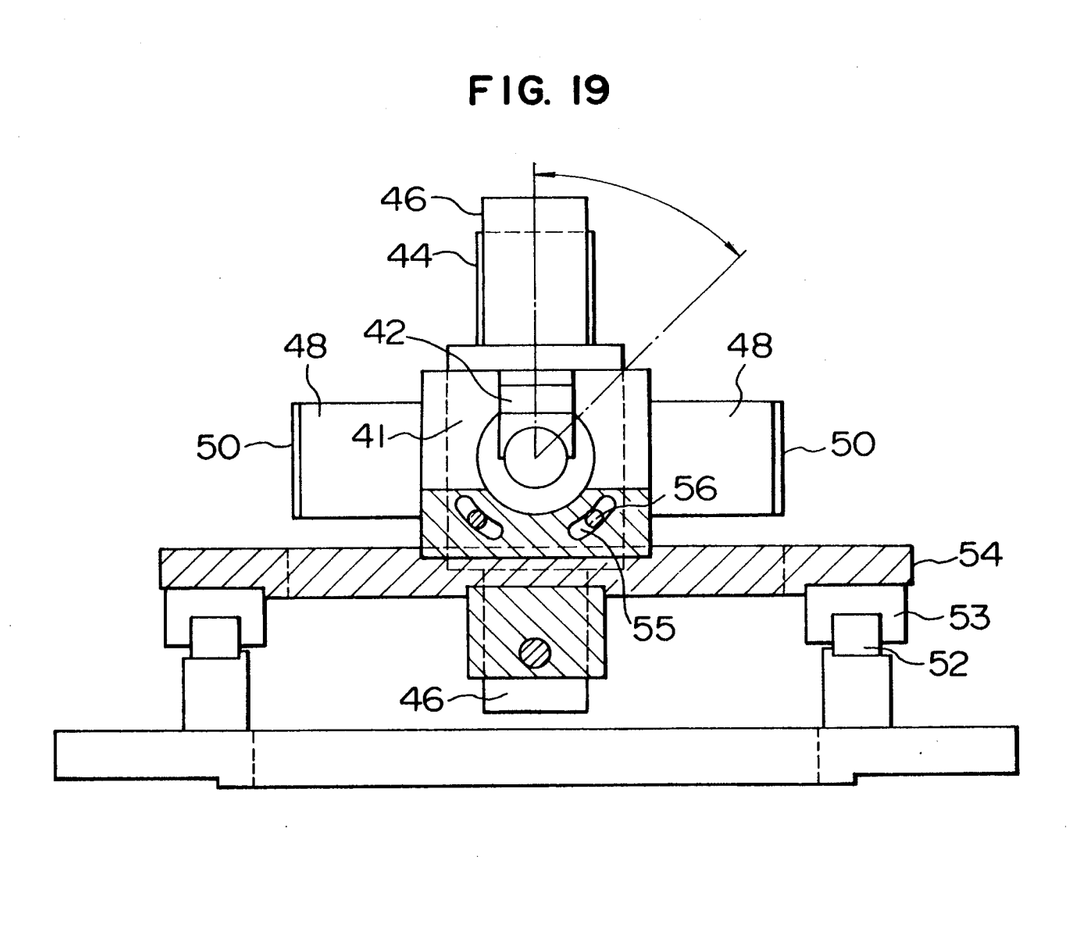
FIG. 19 is a cross-sectional view taken along the line B—B of FIG. 17.
Figure 20:
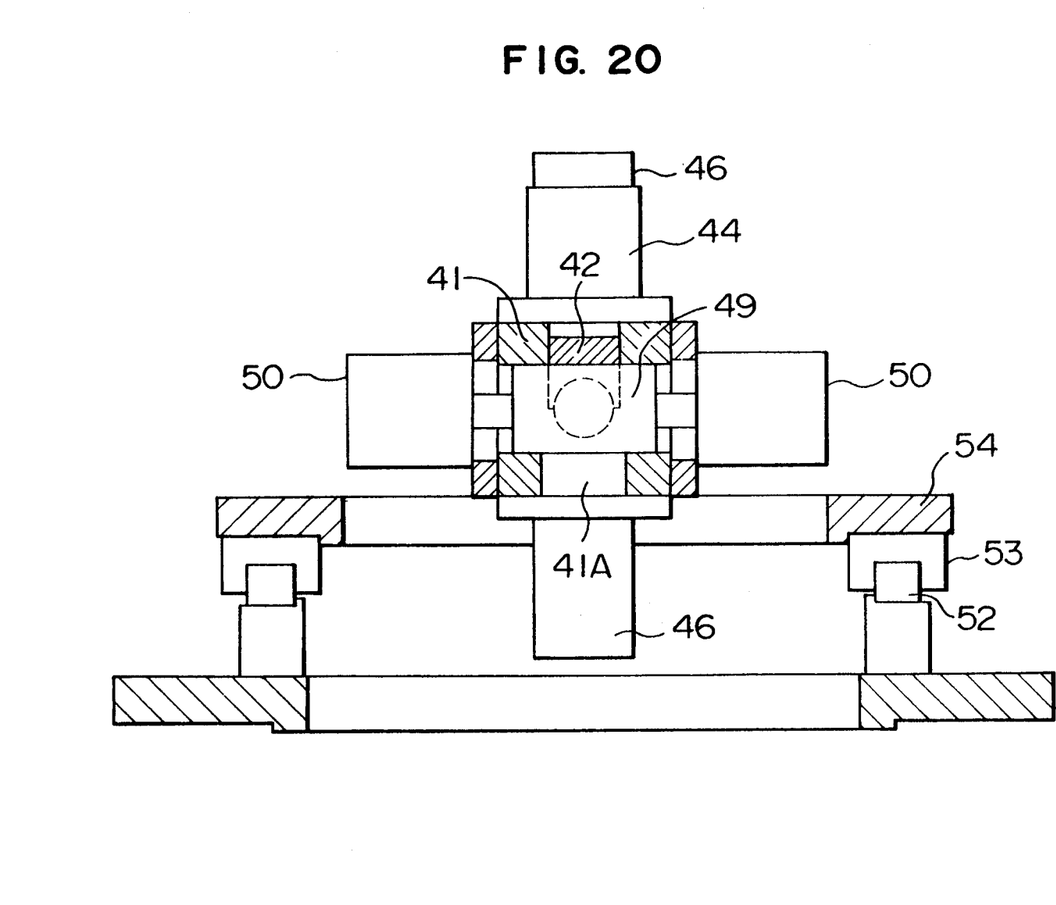
FIG. 20 is a cross-sectional view taken along the line C—C of FIG. 17.

The clamping member 33 for fixing the steel strip 4 is disposed at the entrance of the capsule forming unit 34, as shown in FIG. 17 and 18. A T-shaped clamping head 40 driven by a hydraulic cylinder 39 is provided in a steel strip passage 38A. The steel strip 4 is fixed when the two edge portions thereof are pressed against the inner surface of the steel strip passage 38A by the clamping head 40.

Figure 21:
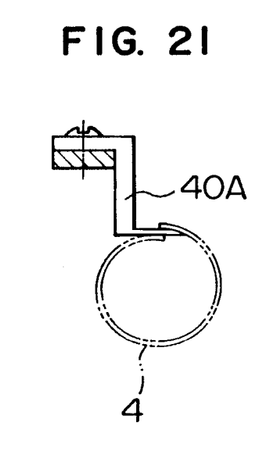
FIG. 21 is a cross-sectional view taken along the line D—D of FIG. 17.
Figure 22:
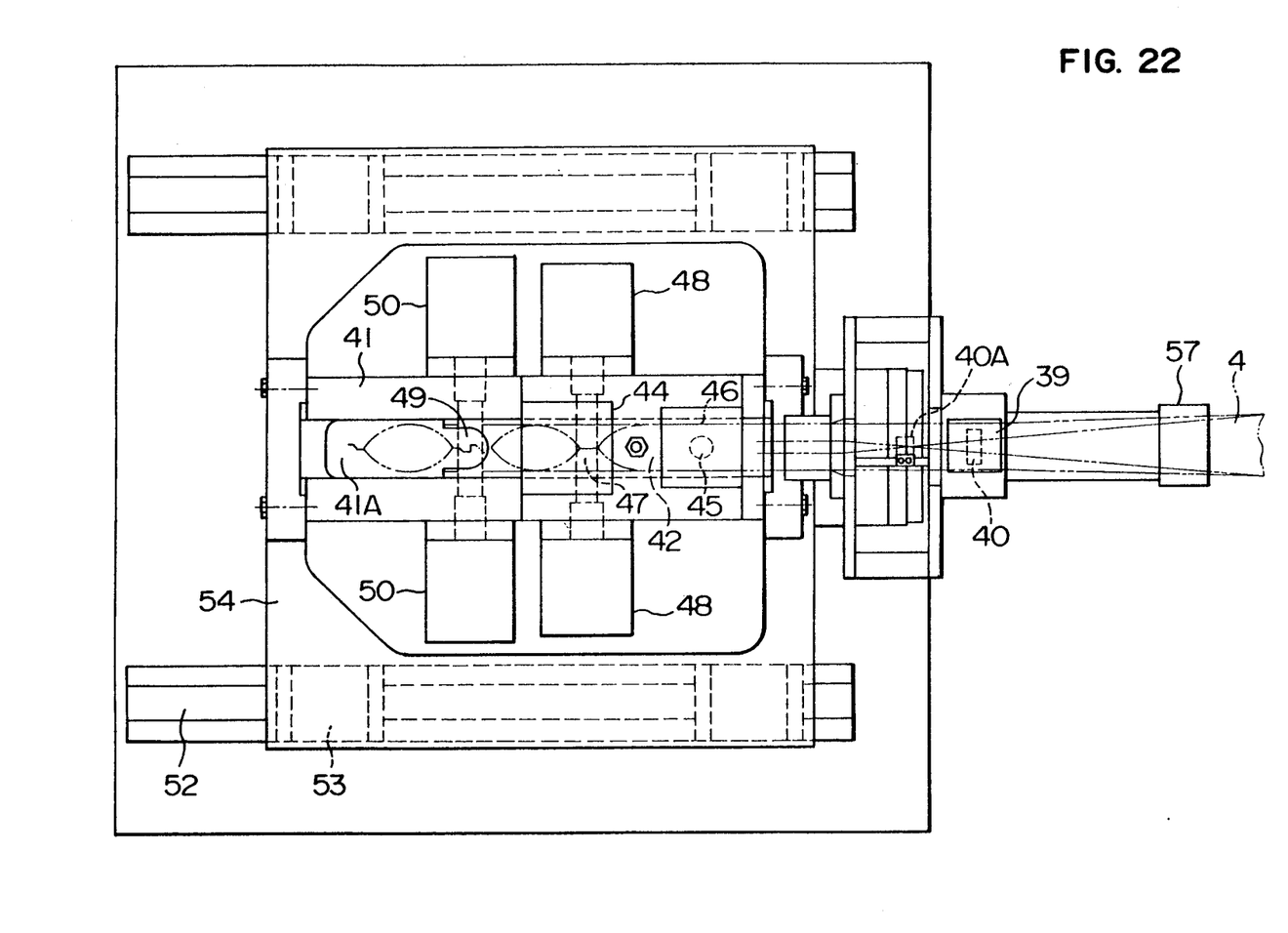
FIG. 22 is a plan view of the capsule forming unit of FIG. 17.

Between the clamping member 33 and the capsule forming unit 34 is provided a guide plate 40A to make one edge portion of the steel strip 4 curved in a circular form by the passage 38A overlap smoothly on the other edge portion thereof, as shown in FIGS. 17 and 21. To overlap the two edge portions of the steel tube 4' on top of the other to a sufficient extent, a steel strip passage 38B has a diameter slightly smaller than the steel strip passage 38A.

As shown in FIGS. 17 through 20 and 22, the capsule forming unit 34 includes a holder 41 having a U-shaped cross-section and serving as a lower die for the steel tube 4', an upper die 42 held by the holder 41 and having a channel with a semi-circular cross-section (upward concave), a member 43 (consisting of a rod 43A and a compression spring 43B) for shifting upward and supporting the upper die 42 to its open position a hydraulic cylinder 44 for pressing the upper die 42 to its closed position, a pair of pressing heads 45 for forming a recess and hydraulic cylinders 46 for driving the pressing heads 45, a pair of pressing heads 47 disposed perpendicular to the pressing heads 45 for crushing the steel tube 4' and hydraulic cylinders 48 for driving the pressing heads 47, pressing heads 49 with a cutting blade and hydraulic cylinders 50 for driving the pressing heads 49, the pressing heads 49 being provided in the same direction as that of the pressing heads 47, and angle adjusting blocks 51 and set bolts thereof 56 for adjusting the tilting angle of the holder 41. The pressing heads 45, 47 and 49 are supported on the holder 41 at fixed intervals in that order with the pressing heads 45 being located closest to the entrance of the capsule forming unit 34.

The holder 41 is mounted on a movable frame 54 having linear guides 53 which slides along linear rails 52. The holder 41 mounted on the movable frame 54 is fixed its position at the front and the rear end by the angle adjusting blocks 51 and the set bolts 56 so that the holder 41 can be fixed at a predetermined tilting angle around the axis parallel to the direction of movement of the movable frame 54. The movable frame 54 is moved by a hydraulic cylinder 57.

To make capsules containing dehydrated sludge using the above-described apparatus, the steel strip 4 is passed through the dancer roll 31, the guide member 31A, the channel forming member 32, the clamping member 33, and then the capsule forming unit 34.

Sludge is charged into the channel of the portion of the steel strip 4 located between the channel forming member 32 and the clamping member 33 by the screw feeder 2. The screw feeder 2 is intermittently operated synchronously with the operation of the hydraulic cylinder 57 for driving the movable frame 54.

The overlapping portion of said sludge containing steel tube 4' is directed upward in the above-mentioned practice. The tilting angle of the holder 41 relative to the moveable frame 54 is adjusted so that the pressing heads 45 can crush the optimum position of the steel tube 4' relative to the overlapping portion. The steel tube 4' containing sludge is slightly recessed by the pressing heads 45 at two opposite positions on periphery, then crushed by the pressing heads 47, and the crushed constriction is cut by the pressing heads 49.

These three pairs of pressing heads are operated in the order of 49, 47 and 45 after the upper die 42 is closed. After the three paris of pressing heads 45, 47 and 49 are operated, the hydraulic cylinder 57 extends at a fixed stroke to push the movable frame 54 and thereby push out the steel tube 4'. By this movement, the steel strip 4 is fed out due to the tension thereof pushing up the dancer roll 31. The steel strip 4 is uncoiled from the steel strip coil 4A when the spring 31B pushes down the dancer roll 31.

When the steel tube 4' is pushed out, it is not clamped by the clamping head 40 of the clamping member 33.

When the three pressing heads 45, 47 and 49 are opened, the portion of the steel tube which is sealed by constriction at the both end is separated from the rest of the steel tube providing a capsule. The capsule falls through a hole 41A in the holder 41 into a receiving box 52A.

After the opening of the three pressing heads 45, 47 and 49, and the upper die 42 as well as the clamping of the clamping head 40 of the clamping member 33, the hydraulic cylinder 57 is contracted to return the capsule forming unit 34 by a predetermined distance while the steel tube 4' is clamped by the clamping head 40 and stays still.

As will be understood from the foregoing description, the method of making capsules of sludge according to the present invention includes the steps of shaping a steel strip into the form of a channel, charging sludge into the channel, overlapping the two edge portions of the steel strip to enclose the sludge, pressing and crushing the outer periphery of the steel tube to form a constriction, cutting the constriction to produce a capsule, and repeating the aforementioned steps.

In this invention, since the unit operation, conventionally required to make agglomerate of sludge, can be omitted, operation can be facilitated. Furthermore, cost of the equipment as well as power, heat energy and consumables required for operation can be reduced or eliminated.

Furthermore, powdering or shattering does not occur in subsequent processes if the sludge is contained in capsules made by the above-mentioned method. If selection of a steel strip material is adequate, sludge capsules may be stored for a long period of time, and be conveyed easily.

What is claimed is:

1. A method of making capsules of dehydrated sludge, said method comprising:
    shaping a steel strip into a channel;
    supplying sludge into the channel formed in the previous step with a sludge extruder;
    shaping the steel strip channel with the sludge charged therein, overlap two edge portions of the steel strip channel with each other to form a substantially circular cross-section tube enclosing the sludge;
    pressing and crushing said steel tube containing said sludge at opposite points on the outer periphery of said tube, while constraining said steel tube between two opposed dies to form a constriction;
    pressing and cutting the constriction; and
    repeating the series of said steps.

2. A method of making capsules of dehydrated sludge according to claim 1, further comprising; moving said steel strip axially toward a delivery side by a predetermined distance while holding said constriction formed in the previous pressing and crushing step before said pressing and cutting step is performed.

3. An apparatus for making capsules of dehydrated sludge, said apparatus comprising:
    a channel forming device for shaping a steel strip into a channel cross-section;
    a sludge supplying device for supplying sludge into the channel;
    a device for overlapping two edge portions of the steel strip channel with the sludge charged therein to form a steel tube;
    two dies for constraining said steel tube from the outside thereof;
    a pressing device for pressing and crushing said steel tube containing said sludge and constrained between said two dies at opposed ends on the outer periphery of said tube to form a constriction;
    and a pressing/cutting device for pressing and cutting said steel tube at said constriction.

4. The apparatus for making capsules of dehydrated sludge according to claim 3, wherein the device for shaping the steel strip into the cross-sectional shape of a channel comprises a member having an arcuate slit.

5. The apparatus for making capsules of dehydrated sludge according to claim 3, wherein the device for shaping the steel strip into the cross-sectional shape of a channel comprises a pair of upper and lower shaping rolls.

6. The apparatus for making capsules of dehydrated sludge according to claim 3, further comprising reciprocating means, arranged to reciprocate between two positions spaced apart from each other by a predetermined distance, said reciprocating means having mounted thereon said two dies, said pressing device and said pressing/cutting device.

7. The apparatus for making capsules of dehydrated sludge according to claim 3, wherein said pressing device comprises a first pair of pressing heads for partially recessing said steel tube at two opposed points on the outer periphery of the tube and a second pair of pressing heads provided at a position downstream of and spaced apart by a predetermined distance from said first pair of pressing heads for pressing and crushing said steel tube at tow opposed points on the outer periphery of the tube in the direction perpendicular to the direction in which said steel tube is recessed by said first pair of pressing heads.

8. The apparatus for making capsules of dehydrated sludge according to claim 3, wherein said pressing/cutting device comprises a pair of pressing heads disposed in opposed relation with each other, each said pressing head having a cutting blade and a bending blade protruding from a center portion and a side portion of a distal end of said pressing head, respectively, wherein said cutting blade, protrudes further than said bending blade.

* * * * *